(12) United States Patent
Wozniak

(10) Patent No.: US 6,507,472 B1
(45) Date of Patent: Jan. 14, 2003

(54) TRANSMISSION CONTROL CIRCUIT

(75) Inventor: Kenneth Paul Wozniak, Chelsea, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 216 days.

(21) Appl. No.: 09/676,747

(22) Filed: Sep. 29, 2000

(51) Int. Cl.[7] .................... H01H 51/20; H01H 51/30; H01H 47/14
(52) U.S. Cl. ........................... 361/160; 361/166
(58) Field of Search ................. 360/160, 139, 360/166; 307/9.1, 10.1; 180/337; 74/473.3, 473.12, 473.18, 473.33

(56) References Cited

U.S. PATENT DOCUMENTS

| | | | | |
|---|---|---|---|---|
| 3,805,640 A | * | 4/1974 | Schneider et al. | 74/645 |
| 4,208,925 A | * | 6/1980 | Miller et al. | 74/866 |
| 4,378,474 A | * | 3/1983 | Olson | 200/12 |
| 4,855,913 A | * | 8/1989 | Brekkestran et al. | 364/424.1 |
| 5,231,254 A | * | 7/1993 | Baker et al. | 200/61.91 |
| 5,475,561 A | * | 12/1995 | Goeckner et al. | 361/189 |
| 5,611,245 A | * | 3/1997 | McKee | 74/336 |

\* cited by examiner

Primary Examiner—Brian Sircus
Assistant Examiner—Z Kitov
(74) Attorney, Agent, or Firm—F. G. McKenzie

(57) ABSTRACT

A transmission control circuit 10 which is adapted for use with an electronically controlled transmission having several transmission control solenoids 12, 14 and 16 and a selectively positionable gear selector 18. Circuit 10 includes a conventional controller 20, electrical switches 22, 24 and 26, a transmission range sensor 28, and vehicle sensors 32. Transmission range sensor 28 is ganged with switches 22, 24 and 26 and is further communicatively coupled to controller 20. Switches 22, 24 and 26 are operatively coupled to gear selector 18 and are respectively and operatively disposed between a battery 30 and solenoids 12, 14 and 16. Switches 22, 24 and 26 are effective to selectively connect and disconnect solenoids 12, 14 and 16 to/from battery 30, thereby selectively enabling and disabling solenoids 12, 14 and 16.

17 Claims, 1 Drawing Sheet

TRANSMISSION CONTROL CIRCUIT

FIELD OF THE INVENTION

This invention relates to a transmission control circuit and more particularly, to a transmission control circuit for an electronically controlled automatic transmission which utilizes a transmission range sensor operatively ganged with one or more electrical switches which selectively enable and disable the transmission's solenoid valves.

BACKGROUND OF THE INVENTION

Transmission systems typically include one or more solenoid valves which are used to selectively activate and deactivate the transmission clutches through one or more hydraulic circuits. Particularly, a controller selectively activates and deactivates the solenoid valves based on various inputs, such as vehicle speed, engine speed and torque, gear selector or "shifter" position and other inputs. Once activated, the selected clutches switch gears by use of hydraulic pressure. Conventional transmissions further include a hydraulic manual control valve which selectively enables and disables the various hydraulic circuits which power the clutches. The use of the hydraulic control valve protects against damage which could otherwise be caused by unwanted solenoid activation which may occur in the presence of electronic malfunctions and system failures. Particularly, the hydraulic control valve disables certain hydraulic circuits based upon the position of the gear selector, thereby ensuring that certain clutches cannot be inadvertently activated, even if their respective corresponding solenoids are errantly energized.

Due to the advancement of electronic controls in automatic transmissions, the integrity of the electrical system is becoming increasingly critical for proper transmission robustness. Many such modern transmissions which utilize direct electronic solenoid control could eliminate the hydraulic manual control valve altogether. However, these systems would require redundancies in the transmission range sensing and processing systems as well as additional high and/or low side solenoid driver circuits to guard against unwanted solenoid operation. These additional systems and components would undesirably increase the cost and complexity of the transmission system and would not provide the same integrity and robustness of a hydraulic manual control valve.

There is therefore a need for a new and improved transmission control circuit which overcomes at least some of the drawbacks of prior systems and which includes one or more high current electrical switches which are operatively connected to or "ganged" with a low current transmission range sensor.

SUMMARY OF THE INVENTION

It is a first object of the invention to provide a transmission control circuit which overcomes some or all of the previously delineated drawbacks associated with prior circuits and systems.

It is a second object of the invention to provide a transmission control circuit including one or more high current electrical switches which selectively enable and disable several transmission solenoid valves, and a low current transmission range sensor which is operatively ganged with the high current electrical switches and which provides a signal which is used to control the solenoid valves.

It is a third object of the invention to provide a transmission control circuit which includes several high current switches which are operatively connected to the transmission gear selector and which selectively connect and disconnect the transmission solenoid valves to the battery based upon the position of the gear selector.

According to a first aspect of the present invention, a control circuit is provided for use with an electronically controlled transmission system of the type having a gear selector, at least one control solenoid and a source of electrical power. The control circuit includes a transmission range sensor which is communicatively coupled to the gear selector, which senses a position of the gear selector and which generates a signal based upon the sensed position; at least one electrical switch which is operatively coupled to the gear selector, to the source of electrical power and to the at least one control solenoid, the at least one electrical switch being effective to selectively connect and disconnect the at least one control solenoid from the battery based upon the position of the gear selector; and a controller which is communicatively coupled to the transmission range sensor and to the at least one control solenoid and which is effective to receive the signal and to cause the at least one control solenoid to be selectively energized and de-energized based upon the signal.

According to a second aspect of the present invention, a method is provided for controlling a transmission system of the type having a battery, a selectively positionable gear selector and a plurality of control solenoids. The method includes the steps of providing a plurality of electronic switches; operatively coupling each of the plurality of electrical switches between the battery and a unique one of the control solenoids; and operatively coupling each of the plurality of electrical switches to the gear selector effective to cause the plurality of electrical switches to selectively connect and disconnect the plurality of control solenoids to and from the battery based upon the position of the gear selector, thereby selectively enabling and disabling the plurality of control solenoids.

These and other features, advantages, and objects of the invention will become apparent by reference to the following specification and by reference to the following drawings.

DETAILED DESCRIPTION OF THE PREFERRED EMBODIMENT OF THE INVENTION

Figure 1:
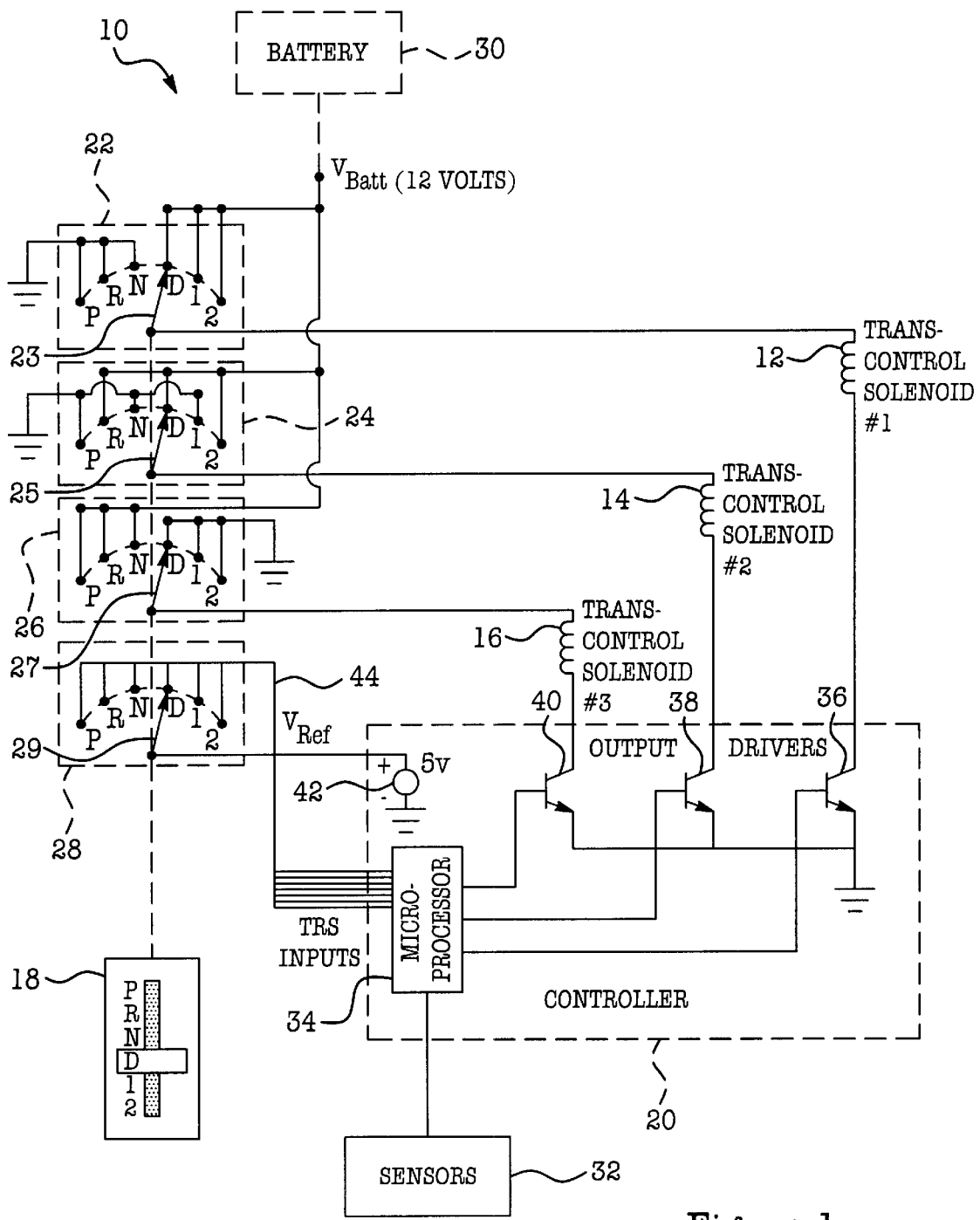
FIG. 1 is a schematic diagram illustrating a transmission control system which is made in accordance with the teachings of the preferred embodiment of the invention.

Referring now to FIG. 1, there is shown a transmission control circuit or system 10 which is made in accordance with the teachings of the preferred embodiment of the invention and which is adapted for use in combination with an automotive vehicle having an electronically controlled transmission which includes several transmission control solenoids 12, 14 and 16 and a selectively positionable gear selector 18.

Circuit 10 includes a conventional controller or control module 20, electrical switches 22, 24 and 26, a transmission range sensor 28, and vehicle sensors 32. Transmission range sensor 28 is communicatively coupled to and/or ganged with switches 22, 24 and 26 and is further communicatively coupled to controller 20. In the preferred embodiment, switches 22, 24 and 26 are physically and/or mechanically coupled to gear selector 18. In the preferred embodiment, sensor 28 and switches 22, 24 and 26 are contained within a single unit or assembly. A conventional electrical power supply or battery 30 is electrically coupled to switches 22, 24 and 26.

Controller 20 is a conventional electronic transmission controller or microcontroller and includes a microprocessor 34 which is communicatively coupled to sensors 28 and 32, several electrical switches or output drivers 36, 38 and 40, and a voltage output terminal 42 which provides a continuous "high" or active signal (e.g., a five volt reference voltage). In the preferred embodiment, output drivers 36–40 comprise conventional solid state or transistor type switches. Controller 20 receives signals from sensors 28 and 32, and based upon the received signals, selectively activates and/or deactivates solenoids 12–16, thereby shifting the vehicle's transmission into a desired gear. As discussed more fully and completely below, microprocessor 34 receives data from sensors 28, 32 and communicates signals to output drivers 36–40, effective to selectively connect/disconnect solenoids 12–16 to/from a ground potential, thereby allowing the solenoids to be selectively energized/de-energized.

Switches 22, 24 and 26 each comprise conventional multi-position high current electrical switches, such as high current linear or rotary switches. Switches 22, 24 and 26 are respectively and operatively disposed between solenoids 12, 14 and 16 and battery 30. In this manner, switches 22, 24 and 26 respectively allow the solenoids 12, 14 and 16 to be selectively connected to and receive voltage from battery 30. Switches 22, 24 and 26 are each electrically, mechanically and/or physically coupled to gear selector 18 and each include several positions which correspond to positions of gear selector 18. Particularly, switches 22, 24 and 26 include positions corresponding to Park ("P"), Reverse ("R"), Neutral ("N"), Drive ("D"), Low ("1"), and High ("2") gear selections of selector 18. In the preferred embodiment, the switching members or levers 23, 25 and 27 of switches 22, 24 and 26 are mechanically coupled to and move with gear selector 18, thereby causing the switches 22, 24 and 26 to maintain the same position as gear selector 18.

Switches 22, 24 and 26 are effective to selectively connect and disconnect solenoids 12, 14 and 16 to battery 30. Particularly, each switch 22, 24 and 26 includes three positions which are electrically connected to battery 30, and three positions which are connected to an electrical ground potential. For example, when switch 22 is in the "D", "1" and "2" positions, solenoid 12 is electrically connected to battery 30, and when switch 22 is in the "P", "R" and "N" positions, solenoid 12 is disconnected from battery 30 (e.g., is connected to an electrical ground potential), and is thereby disabled. When switch 24 is in the "D", "R" and "2" positions, solenoid 14 is electrically connected to battery 30, and when switch 24 is in the "P", "N" and "1" positions, solenoid 14 is disconnected from battery 30 (e.g., is connected to an electrical ground potential), and is thereby disabled. When switch 26 is in the "P", "R" and "N" positions, solenoid 16 is electrically connected to battery 30, and when switch 26 is in the "D", "1" and "2" positions, solenoid 16 is disconnected from battery 30 (e.g., is connected to an electrical ground potential), and is thereby disabled. In other alternate embodiments, switches 22, 24 and 26 may be coupled to an electrical "open circuit", rather than an electrical ground potential.

It should be appreciated that the above-described circuit structures are non-limiting examples of suitable electrical switches and that in other embodiments, different types and arrangements of switches may be used. For example and without limitation, in alternate embodiments, switches 22, 24 and 26 may be contained in separate switching units or assemblies. In other embodiments, each of switches 22, 24 and 26 may comprise multiple switching mechanisms. Moreover, depending on the type of transmission, additional switches may be ganged with sensor 28 to control additional solenoids. In one non-limiting embodiment, switches 22, 24 and 26 are operatively disposed on the "low side" of solenoids 12, 14 and 16 and are effective to selectively connect and disconnect solenoids 12, 14 and 16 to and from an electrical ground. In such an embodiment, output drivers 36, 38 and 40 are operatively disposed on the "high side" of solenoids 12, 14 and 16 and are effective to selectively connect and disconnect solenoids 12, 14 and 16 to battery 30.

Sensor 28 is a conventional low current transmission range sensor which is operatively connected to gear selector 18 and controller 20. Sensor 28 is effective to monitor the position of gear selector 18 and to provide a signal to controller 20 representing the position of gear selector 18 over bus assembly 44.

Sensors 32 comprise one or more conventional vehicle sensors which are effective to measure vehicle operating attributes, such as vehicle speed, engine speed, engine torque, braking effort, and other vehicle operating attributes, and to communicate signals to microprocessor 34 representing the measured attributes. Based upon the value of the signals received from sensors 28, 32, microprocessor 34 determines the appropriate gear in which the transmission should be operating, and communicates the appropriate signals to output drivers 36, 38, 40 to cause the transmission to enter into the appropriate gear.

In operation, as gear selector 18 is moved between its various positions (e.g., P,R,N,D,1,2), each of switches 22, 24 and 26 is moved to a corresponding position, effective to selectively connect and disconnect solenoids 12, 14 and 16 to/from battery 30, thereby selectively enabling and disabling solenoids 12, 14 and 16. Transmission range sensor 28 senses the position of gear selector 18 and transmits the positional data to microprocessor 34. Based upon this data and data received from sensors 32, microprocessor 34 communicates signals to switches 36, 38 and 40, effective to selectively connect and disconnect solenoids 12, 14 and 16 to/from ground, thereby selectively energizing and de-energizing solenoids 12, 14 and 16. Particularly, by connecting solenoids 12, 14, and 16 to ground, any of the solenoids 12–16 which are also connected to battery 30 will be energized (e.g., electrical power will flow from battery 30 to ground though the solenoid, thereby energizing the solenoid).

For example and without limitation, as shown in FIG. 1, when gear selector 18 is in the "D" or "Drive" position, switches 22 and 24 respectively connect the "high" side of solenoids 12 and 14 to battery 30, thereby enabling solenoids 12 and 14, while switch 26 disconnects the "high" side of solenoid 16 from battery 30, thereby disabling solenoid 16. By selectively activating switches 38 and 40, microprocessor 34 is able to selectively connect the "low" side of solenoids 12, 14 to ground, effective to cause electrical power from battery 30 to flow through solenoids 12, 14, thereby energizing the solenoids 12, 14 and effecting a desired gear shift.

It should be appreciated that use of switches 22, 24 and 26 provides robust protection against inadvertent or errant activation of solenoids 12, 14 and 16 which may arise from processor or system malfunctions. Particularly, by electrically disconnecting solenoids 12, 14 and 16 from battery 30 when the transmission is in certain gears, circuit 10 ensures that the solenoids cannot be activated, even if microprocessor 34 errantly activates any of drivers 36, 38 and 40. Circuit 10 provides this robust protection in a simple and reliable manner, and without the use of a hydraulic manual control valve.

In one non-limiting embodiment, controller 20 uses smart drivers to monitor the state of switches 22, 24 and 26 to test the electrical potential at the switches and ensure proper functioning. In another alternate embodiment, controller 20 uses sensors 32 to monitor faulty switch operation by detecting pressure within the hydraulic circuits.

It should be understood that the inventions described herein are provided by way of example only and that numerous changes, alterations, modifications, and substitutions may be made without departing from the spirit and scope of the inventions as delineated within the following claims.

What is claimed is:

1. A control circuit for use with an electronically controlled transmission system of the type having a gear selector, at least one control solenoid and a source of electrical power, said control circuit comprising:

a transmission range sensor which is communicatively coupled to said gear selector, which senses a position of said gear selector and which generates a signal based upon said sensed position;

at least one electrical switch which is operatively coupled to said gear selector, to said source of electrical power and to said at least one control solenoid, said at least one electrical switch being effective to selectively connect and disconnect said at least one control solenoid to and from said source of electrical power based upon said position of said gear selector; and a controller which is communicatively coupled to said transmission range sensor and to said at least one control solenoid and which is effective to receive said signal and to cause said at least one control solenoid to be selectively energized and de-energized based upon said signal;

wherein said at least one electrical switch comprises a plurality of switch positions which correspond to a plurality of gear positions of said gear selector.

2. The control circuit of claim 1 wherein said at least one electrical switch is ganged with said transmission range sensor.

3. The control circuit of claim 1 wherein said controller selectively energizes said at least one control solenoid by coupling a low side of said at least one control solenoid to a ground potential.

4. The control circuit of claim 1 further comprising:

at least one vehicle attribute sensor which is effective to measure an attribute of said vehicle and to generate a second signal representing said measured attribute; and wherein said controller is further communicatively coupled to said at least one vehicle attribute sensor, and is further effective to receive said second signal and to cause said at least one control solenoid to be selectively energized and de-energized based further upon said second signal.

5. The control circuit of claim 1 wherein said at least one electrical switch comprises a linear type switch.

6. The control circuit of claim 1 wherein said at least one electrical switch comprises a rotary type switch.

7. The control circuit of claim 1 wherein said at least one control solenoid comprises three control solenoids, and wherein said at least one electrical switch comprises three electrical switches.

8. An electronically controlled transmission system comprising:

a battery;

a plurality of control solenoids;

a selectively positionable gear selector;

a transmission range sensor which is communicatively coupled to said gear selector, which senses a position of said gear selector and which generates a signal based upon said sensed position;

a plurality of switches which are each operatively coupled to said gear selector and ganged with said transmission range sensor, and which are each coupled to said battery and to a unique one of said plurality of control solenoids, said plurality of switches being effective to selectively connect and disconnect said plurality of control solenoids to and from said battery based upon said sensed position of said gear selector; and a controller which is communicatively coupled to said transmission range sensor and to said plurality of control solenoids and which is effective to receive said signal and to cause said plurality of control solenoids to be selectively energized and de-energized based upon said signal.

9. The electronically controlled transmission system of claim 8 wherein said plurality of switches are mechanically coupled to said gear selector.

10. The electronically controlled transmission system of claim 9 wherein said plurality of switches comprise rotary type switches.

11. The electronically controlled transmission system of claim 9 wherein said plurality of switches comprise linear type switches.

12. A method of controlling a transmission system of the type having a battery, a selectively positionable gear selector and a plurality of control solenoids, said method comprising the steps of:

providing a plurality of electrical switches;

operatively coupling each of said plurality of electrical switches between said battery and a unique one of said control solenoids; and operatively coupling each of said plurality of electrical switches to said gear selector effective to cause said plurality of electrical switches to selectively connect and disconnect said plurality of control solenoids to and from said battery based upon the position of said gear selector, thereby selectively enabling and disabling said plurality of control solenoids.

13. The method of claim 12 wherein said plurality of electrical switches are mechanically coupled to said gear selector.

14. The method of claim 12 further comprising the steps of:

sensing a position of said gear selector; and selectively energizing at least one of said control solenoids based upon said sensed position of said gear selector.

15. The method of claim 14 wherein said step of selectively energizing at least one of said control solenoids is performed by coupling a low side of said at least one of said control solenoids to an electrical ground potential.

16. The method of claim 14 wherein said position of said gear selector is sensed by use of a transmission range sensor which is ganged with said plurality of electrical switches.

17. The method of claim 16 wherein each of said plurality of electrical switches comprises a plurality of switch positions which correspond to a plurality of gear positions of said gear selector.

* * * * *